UNITED STATES PATENT OFFICE.

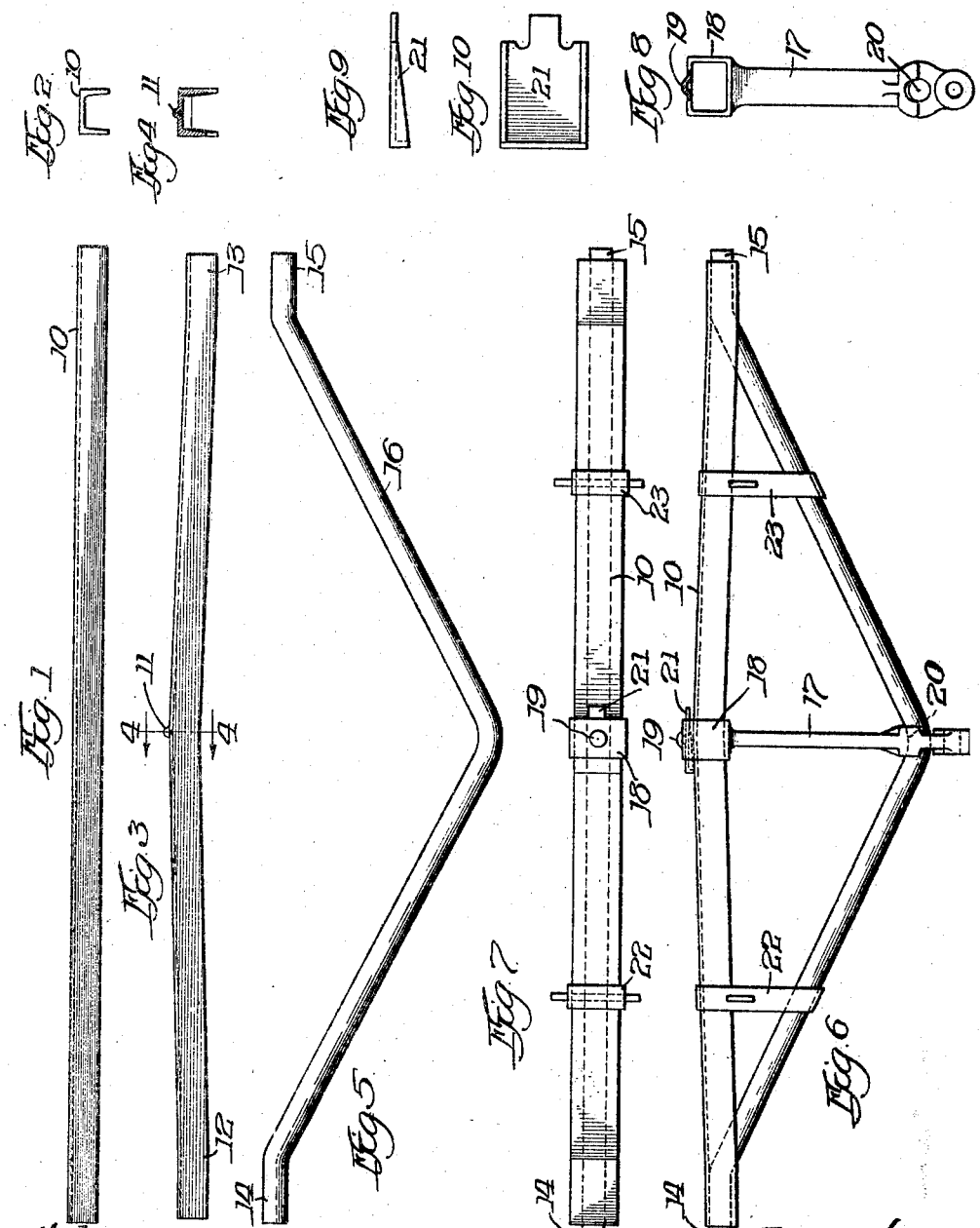

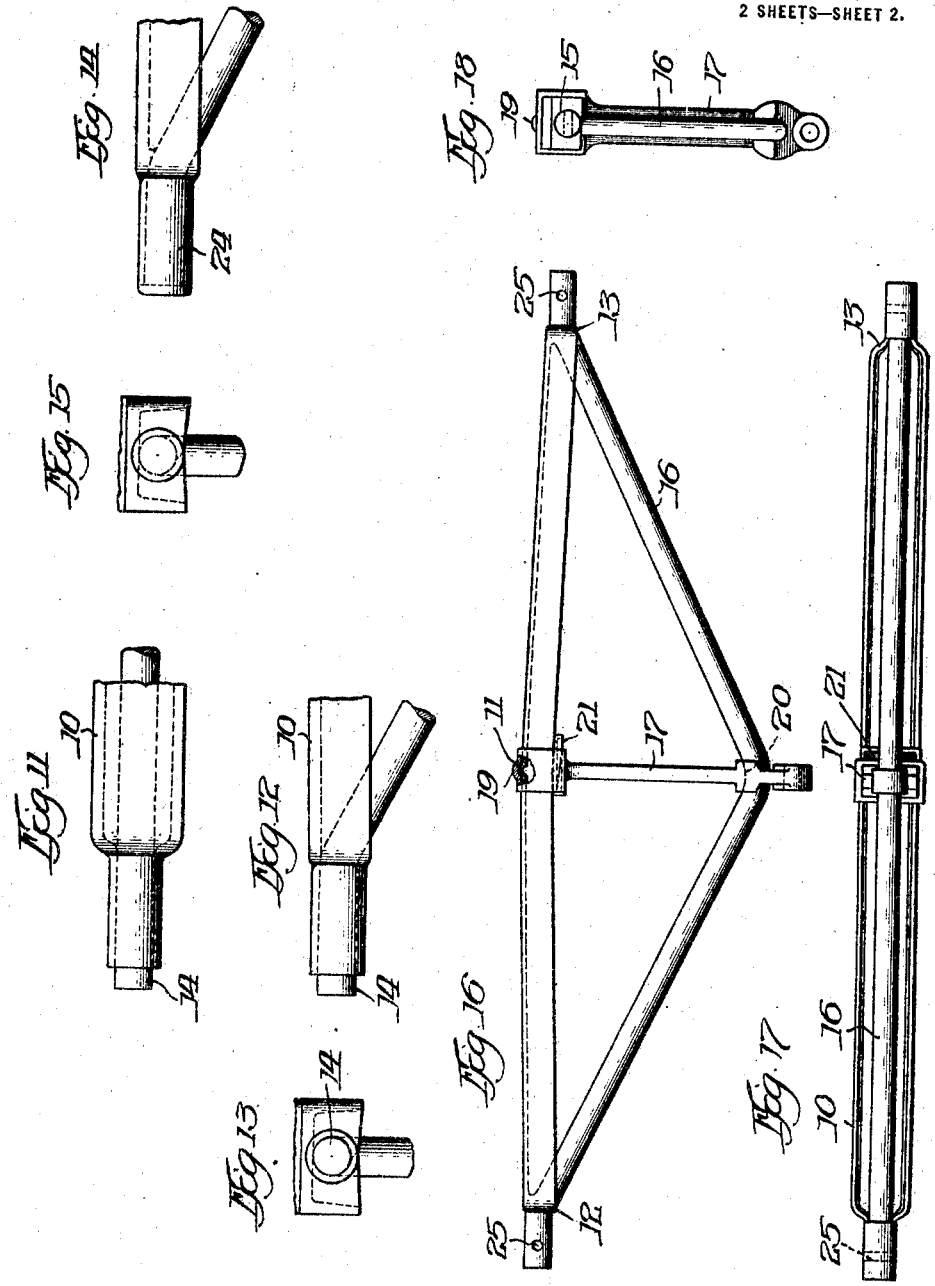

LOREN L. WHITNEY, OF HAMMOND, INDIANA, ASSIGNOR TO AMERICAN STEEL FOUNDRIES, OF NEW YORK, N. Y., A CORPORATION OF NEW JERSEY.

METHOD OF MANUFACTURING BRAKE-BEAMS.

1,303,435.  Specification of Letters Patent.  Patented May 13, 1919.

Original application filed July 12, 1917, Serial No. 180,092. Divided and this application filed November 30, 1917. Serial No. 204,573.

*To all whom it may concern:*

Be it known that I, LOREN L. WHITNEY, a citizen of the United States, and resident of Hammond, in the county of Lake and State of Indiana, have invented certain new and useful Improvements in Methods of Manufacturing Brake-Beams, of which the following is a specification.

This invention relates to brake beams, and more particularly to the method of manufacturing the same, this application being a division of application Serial Number 180,092, filed July 12, 1917.

Tension and compression members of a brake beam are tied together at their ends in various ways. The manner of tying the ends in many instances is such that the diameter of the brake head trunnions is restricted.

It is therefore one object of my invention to improve brake beams and the method of constructing a brake beam and tying the ends of the tension and compression members whereby the diameter of the trunnions formed on their ends will not be restricted.

Another object is to improve and more properly distribute in an economical manner the material in the various parts of a brake beam.

Another object is to provide a simple compact brake beam adapted to meet the various requirements for successful commercial operation.

These and other objects are accomplished by providing a brake beam having tension and compression members, the outer ends of which are welded together to form trunnions for brake heads.

The invention is illustrated on the accompanying sheets of drawings, in which—

Figure 1 is a plan view, and Fig. 2 is an end elevation of the stock for a compression member of my brake beam;

Fig. 3 is a plan view, and Fig. 4 is a sectional view taken in the plane of line 4—4 of Fig. 3 of the same compression member after it has been formed;

Fig. 5 is a plan view of a tension member;

Fig. 6 is a plan view, and Fig. 7 a front elevation of the various parts of the brake beam clamped together prior to being permanently fastened;

Fig. 8 is a side elevation, a part being in section, of a fulcrum or strut which extends between the tension and compression members;

Fig. 9 is a side elevation, and Fig. 10 a plan view of a key used for securing the strut to the compression member;

Fig. 11 is a fragmentary elevation of the joined ends of the tension and compression members showing the compression member wrapped around the end of a tension member;

Fig. 12 is a plan view, and Fig. 13 is an end elevation showing the welded ends of the tension and compression members;

Fig. 14 is a fragmentary plan view, and Fig. 15 is an end elevation showing the end of the tension member upset; and Fig. 16 is a plan view; Fig. 17 a front elevation, and Fig. 18 a side elevation of the completed brake beam.

The various novel features of my invention will be apparent from the following description and drawings, and will be particularly pointed out in the appended claims.

In the construction of brake beams, many times it is found that a trunnion necessarily is of such a small diameter that it is impracticable or difficult to properly connect the tension and compression members at the ends of the beams. By means of my invention I have provided an improved brake beam, and a method of constructing the same, in which the ends of the brake beam tension and compression members are welded together and form trunnions of any desired dimensions, the size of the trunnions in no wise being restricted by the means for tying the tension and compression members together.

In Figs. 1 and 2 I have shown the stock of a compression member 10, which, in this particular case, although not necessarily so, is a channel member. This channel member 10, in its first treatment, is shaped, as shown in Figs. 3 and 4, being bent slightly in the middle and also being provided with a nib 11, to be referred to hereinafter. The outer ends of the channel 10, as shown in Fig. 3, are provided with horizontally arranged portions 12 and 13 which receive the corresponding ends 14 and 15 of a substantially V-shaped tension member 16. After the tension and compression members 10 and 16 are shaped, as shown in Figs. 3 and 5, a strut or fulcrum member 17 is placed on the tension and compression members. A band portion 18 of the member 17 passes around the compression member 10 and occupies a central position with respect thereto so that a recess 19 formed in the band 18 of the member 17 is adjacent the nib 11 on the compression member. An opening 20 in the member 17 receives the tension member 16 and occupies the bent portion or apex of the tension member. After the strut or fulcrum member 17 is passed onto the tension and compression members, as shown in Fig. 6, the ends 14 and 15 of the tension member are placed within the ends of the adjacent compression member 10; or, in other words, the ends of the channel embrace the ends of the tension member, as shown in same figure. A key 21, shown in Figs. 9 and 10, temporarily is passed through the band 18 of member 17 between the outer end of the band and the back of the channel 10 for bracing the parts in question. The tension and compression members are further held in position, as shown in Fig. 6, by other temporary braces 22 and 23. The whole structure with its various parts clamped and keyed tightly together is ready for the heating process. The ends of the tension and compression members are heated to a welding heat and then inserted in a suitable forging machine for welding and upsetting the ends.

In Figs. 11, 12 and 13, I have shown the manner in which the outer end of the channel compression member 10 has been wrapped around the outer end 14 of the tension member by the action of suitable gripping dies of the forging machine, it being noted that the end 14 of the tension member extends beyond the end of the compression member. The end of the beam is next upset, as shown in Figs. 14 and 15, the ends of the tension and compression members being welded together and finished by suitable gripping dies and a plunger die. The tension and compression members are now one integral structure, the dotted lines in Fig. 14 indicating approximately the welds. The trunnions, only one of which is shown in Fig. 14, are formed during the welding and upsetting operation, and it is apparent that the diameter or other dimensions of the trunnion may easily be varied in accordance with requirements and are not restricted in any manner whatsoever by tying means between the tension and compression members.

In Figs. 16, 17 and 18, are shown the completed beam. It will be noted that the wedge key 21 has been withdrawn from its temporary location at the back of the compression member and inserted in the front of the compression member between the latter and the band 18 of the strut or fulcrum member 17, thus keying up the strut tightly and eliminating any looseness that may be developed in the upsetting and welding operations. The nib 11 in the back of the compression member now fits in the recess 19 of the fulcrum member or strut 17 preventing any lateral movement of the strut. The trunnions at the ends of the beam may be provided with drilled holes 25 for cotter pins, threaded or provided with locking grooves to provide means for retaining the brake heads in position.

This beam is simple and compact and there is a proper and economical distribution of material in the various parts, and at the same time has trunnions at the ends of the beam for mounting brake heads, the diameter of the trunnions in no wise being restricted by the necessity of allowing space for the usual methods of tying the ends of the tension and compression members. At the same time the method of forming the beam is direct and simple.

It will be appreciated that the tension and compression members may have different sections than those herein shown, and that the structure may be otherwise modified. The method of keying the fulcrum in place may be varied, and there may be other modifications of the invention herein particularly shown and described, and it is my intention to cover all such modifications which do not involve a departure from the spirit and scope of the invention as set forth in the following claims.

What I claim is:

1. The method of forming a brake beam having tension and compression members consisting first in connecting a strut to said members, then clamping the ends of the members together, then temporarily keying the strut to one of said members, then heating the ends to a welding heat, then welding them together to form a trunnion for a brake head, and then permanently keying the strut to one of said members for eliminating any looseness occasioned by the above mentioned operations.

2. The method of forming a brake beam having tension and compression members consisting first in forming the compression member, then forming the tension member, then connecting said members with a strut intermediate the ends of said members, then bringing the ends of said members together, then heating the ends of said members to a welding heat, then welding and upsetting the ends of said members to form trunnions for brake heads, and then keying said strut to the compression member for eliminating any looseness occasioned by the above mentioned operations.

Signed at Hammond, Indiana, this 19″ day of November, A. D. 1917.

LOREN L. WHITNEY.

Witnesses:
WM. C. LEIMBACH,
J. M. EBERT.

Copies of this patent may be obtained for five cents each, by addressing the "Commissioner of Patents, Washington, D. C."